United States Patent
Mizrahi

(10) Patent No.: US 12,183,125 B2
(45) Date of Patent: Dec. 31, 2024

(54) AUTOMOTIVE DATA PROCESSING SYSTEM WITH EFFICIENT GENERATION AND EXPORTING OF METADATA

(71) Applicant: Marvell Asia Pte Ltd., Singapore (SG)

(72) Inventor: Noam Mizrahi, Modi+3 in (IL)

(73) Assignee: MARVELL ASIA PTE LTD., Singapore (SG)

( * ) Notice: Subject to any disclaimer, the term of this patent is extended or adjusted under 35 U.S.C. 154(b) by 332 days.

(21) Appl. No.: 17/114,534

(22) Filed: Dec. 8, 2020

(65) Prior Publication Data

US 2021/0183173 A1 Jun. 17, 2021

Related U.S. Application Data

(60) Provisional application No. 62/948,027, filed on Dec. 13, 2019.

(51) Int. Cl.
| | | |
|---|---|---|
| G07C 5/00 | (2006.01) | |
| G06N 5/04 | (2023.01) | |
| G06N 20/00 | (2019.01) | |
| G07C 5/08 | (2006.01) | |

(52) U.S. Cl.
CPC .............. G07C 5/008 (2013.01); G06N 5/04 (2013.01); G06N 20/00 (2019.01); G07C 5/085 (2013.01)

(58) Field of Classification Search
CPC ...... G07C 5/008; G07C 5/085; G07C 5/0808; G06N 20/00; G06N 5/04; B60W 50/04; G06F 16/906
See application file for complete search history.

(56) References Cited

U.S. PATENT DOCUMENTS

| | | |
|---|---|---|
| 6,012,068 A | 1/2000 | Boezeman |
| 6,215,749 B1 | 4/2001 | Kim |
| 7,127,120 B2 | 10/2006 | Hua et al. |
| 7,788,592 B2 | 8/2010 | Williams et al. |
| 7,801,910 B2 | 9/2010 | Houh et al. |
| 8,938,492 B1 | 1/2015 | Kelly |

(Continued)

FOREIGN PATENT DOCUMENTS

| | | |
|---|---|---|
| CA | 2659167 A1 | 3/2008 |
| CN | 101605210 A | 12/2009 |

(Continued)

OTHER PUBLICATIONS

U.S. Appl. No. 16/264,248 Office Action dated Dec. 13, 2021.

(Continued)

*Primary Examiner* — Jelani A Smith
*Assistant Examiner* — Alyssa Rorie

(57) ABSTRACT

An automotive data processing system includes a storage subsystem and a processor. The storage subsystem is disposed in a vehicle and is configured to store at least data produced by one or more data sources of the vehicle. The processor is installed in a vehicle and is configured to apply, to the data stored in the storage subsystem or that is en route to be stored in the storage subsystem, at least one model that identifies one or more specified features-of-interest in the data, so as to generate metadata that tags occurrences of the specified features-of-interest in the stored data, and to export at least part of the metadata to an external system that is external to the vehicle.

25 Claims, 2 Drawing Sheets

(56) References Cited

U.S. PATENT DOCUMENTS

| | | | |
|---|---|---|---|
| 9,015,788 B2 | 4/2015 | Gu et al. | |
| 9,451,329 B2 | 9/2016 | Whitman et al. | |
| 9,465,892 B2 | 10/2016 | Shamma | |
| 9,639,969 B1 | 5/2017 | Wilson et al. | |
| 9,966,112 B1 | 5/2018 | Kulkarni et al. | |
| 10,860,508 B2 | 12/2020 | Bolkhovitin et al. | |
| 10,884,996 B1 | 1/2021 | Suresh et al. | |
| 10,963,393 B1 | 3/2021 | Ben-Yehuda et al. | |
| 11,221,939 B2* | 1/2022 | Degaonkar | G06F 11/0778 |
| 11,748,343 B2* | 9/2023 | Itzkovich | G06Q 50/40 707/737 |
| 2004/0143590 A1 | 7/2004 | Wong et al. | |
| 2005/0055406 A1 | 3/2005 | Singhai et al. | |
| 2006/0047706 A1 | 3/2006 | Castro et al. | |
| 2006/0173985 A1 | 8/2006 | Moore | |
| 2006/0242178 A1 | 10/2006 | Butterfield et al. | |
| 2006/0274949 A1 | 12/2006 | Gallagher et al. | |
| 2007/0038647 A1 | 2/2007 | Thomas et al. | |
| 2007/0078896 A1 | 4/2007 | Hayashi et al. | |
| 2007/0156726 A1* | 7/2007 | Levy | G06F 16/21 |
| 2007/0226238 A1 | 9/2007 | Kiilerich et al. | |
| 2007/0239779 A1 | 10/2007 | Hugill et al. | |
| 2007/0239780 A1 | 10/2007 | Hugill et al. | |
| 2008/0195664 A1 | 8/2008 | Maharajh et al. | |
| 2008/0222201 A1 | 9/2008 | Chen et al. | |
| 2008/0304747 A1 | 12/2008 | Marinkovich et al. | |
| 2009/0077561 A1 | 3/2009 | Feng et al. | |
| 2009/0132462 A1 | 5/2009 | Szabo | |
| 2009/0216719 A1 | 8/2009 | Coffman et al. | |
| 2010/0177938 A1 | 7/2010 | Martinez et al. | |
| 2010/0179874 A1 | 7/2010 | Higgins et al. | |
| 2011/0154290 A1 | 6/2011 | Kelly | |
| 2011/0235858 A1* | 9/2011 | Hanson | G06F 18/23 382/103 |
| 2011/0289094 A1 | 11/2011 | Fisher | |
| 2012/0265735 A1 | 10/2012 | McMillan et al. | |
| 2012/0278560 A1 | 11/2012 | Benzion et al. | |
| 2012/0278705 A1 | 11/2012 | Yang et al. | |
| 2013/0097172 A1 | 4/2013 | McIntosh | |
| 2013/0170813 A1 | 7/2013 | Woods et al. | |
| 2013/0289991 A1 | 10/2013 | Eshwar et al. | |
| 2013/0297652 A1 | 11/2013 | Higgins et al. | |
| 2014/0047188 A1 | 2/2014 | Xia | |
| 2014/0074836 A1 | 3/2014 | Adams et al. | |
| 2014/0074855 A1 | 3/2014 | Zhao et al. | |
| 2014/0122427 A1 | 5/2014 | Dary | |
| 2014/0250256 A1 | 9/2014 | Duran | |
| 2014/0270407 A1 | 9/2014 | Balakrishnan et al. | |
| 2015/0016691 A1 | 1/2015 | Anbalagan et al. | |
| 2015/0074476 A1 | 3/2015 | Kim | |
| 2015/0156263 A1 | 6/2015 | Clayton et al. | |
| 2015/0193168 A1 | 7/2015 | Sundaram et al. | |
| 2016/0036882 A1 | 2/2016 | Jin et al. | |
| 2016/0170871 A1 | 6/2016 | Hyun et al. | |
| 2016/0191591 A1 | 6/2016 | Rider et al. | |
| 2016/0335339 A1 | 11/2016 | Venkataraman et al. | |
| 2016/0378402 A1 | 12/2016 | Amidi et al. | |
| 2017/0083519 A1 | 3/2017 | Huang et al. | |
| 2017/0094341 A1 | 3/2017 | Berner et al. | |
| 2017/0169358 A1 | 6/2017 | Choi et al. | |
| 2017/0185869 A1 | 6/2017 | Dua et al. | |
| 2017/0192860 A1 | 7/2017 | Vijayan et al. | |
| 2017/0193362 A1 | 7/2017 | Cremer et al. | |
| 2017/0199886 A1 | 7/2017 | Perrine et al. | |
| 2017/0206030 A1 | 7/2017 | Woo et al. | |
| 2017/0235671 A1 | 8/2017 | Jung | |
| 2017/0293431 A1 | 10/2017 | Dor et al. | |
| 2017/0304732 A1 | 10/2017 | Velic et al. | |
| 2017/0331893 A1 | 11/2017 | Crofton et al. | |
| 2018/0004213 A1 | 1/2018 | Absmeier | |
| 2018/0024770 A1 | 1/2018 | Lee | |
| 2018/0033208 A1 | 2/2018 | Martin | |
| 2018/0046869 A1* | 2/2018 | Cordell | G08B 21/06 |
| 2018/0067697 A1 | 3/2018 | Lee et al. | |
| 2018/0077420 A1 | 3/2018 | Dunham et al. | |
| 2018/0107592 A1 | 4/2018 | Hashimoto | |
| 2018/0144752 A1 | 5/2018 | McDowell et al. | |
| 2018/0157421 A1 | 6/2018 | Brown et al. | |
| 2018/0173619 A1 | 6/2018 | Sivasankaran et al. | |
| 2018/0189615 A1 | 7/2018 | Kang et al. | |
| 2018/0189635 A1 | 7/2018 | Olarig et al. | |
| 2018/0307609 A1 | 10/2018 | Qiang et al. | |
| 2018/0329786 A1 | 11/2018 | Gokhale | |
| 2019/0065054 A1 | 2/2019 | Park | |
| 2019/0138617 A1 | 5/2019 | Farre Guiu et al. | |
| 2019/0278704 A1 | 9/2019 | Lee | |
| 2020/0042240 A1 | 2/2020 | Therene et al. | |
| 2020/0042548 A1 | 2/2020 | Mizrahi | |
| 2020/0042549 A1 | 2/2020 | Mizrahi | |
| 2020/0042557 A1 | 2/2020 | Kudryavtsev et al. | |
| 2020/0042888 A1 | 2/2020 | Yu et al. | |
| 2020/0045110 A1 | 2/2020 | Varnica et al. | |
| 2020/0312052 A1* | 10/2020 | Bonnevay | G07C 5/085 |
| 2020/0364953 A1* | 11/2020 | Simoudis | G06N 5/022 |
| 2020/0402328 A1* | 12/2020 | Westlund | G07C 5/085 |
| 2021/0158171 A1* | 5/2021 | Rausch | H04L 67/1097 |
| 2021/0192867 A1* | 6/2021 | Fang | G07C 5/0808 |
| 2021/0209132 A1* | 7/2021 | Fukushima | G06F 16/906 |
| 2021/0241177 A1* | 8/2021 | Wang | G06N 20/00 |
| 2021/0263969 A1* | 8/2021 | Sun | G06F 18/23 |
| 2021/0279603 A1* | 9/2021 | Teran Matus | G06F 16/285 |
| 2022/0161815 A1* | 5/2022 | Van Beek | B60W 50/16 |

FOREIGN PATENT DOCUMENTS

| | | | |
|---|---|---|---|
| CN | 101754056 A | 6/2010 | |
| CN | 104575595 A | 4/2015 | |
| CN | 107622281 A | 1/2018 | |
| EP | 1708107 A2 | 10/2006 | |
| EP | 3244347 A1 | 11/2017 | |
| JP | 2002099903 A | 4/2002 | |
| JP | 2003228788 A | 8/2003 | |
| JP | 2008192102 A | 8/2008 | |
| JP | 2008204193 A | 9/2008 | |
| JP | 2010039966 A | 2/2010 | |
| JP | 2011065314 A | 3/2011 | |
| JP | 2012103921 A | 5/2012 | |
| JP | 2012221322 A | 11/2012 | |
| JP | 2014241045 A | 12/2014 | |
| JP | 2016143352 A | 8/2016 | |
| JP | 2019200495 A | 11/2019 | |
| WO | 2007123797 A1 | 11/2007 | |
| WO | 2009003685 A1 | 1/2009 | |
| WO | 2009022781 A1 | 2/2009 | |
| WO | 2009035193 A1 | 3/2009 | |
| WO | 2014133495 A1 | 9/2014 | |
| WO | 2014133497 A1 | 9/2014 | |
| WO | 2014170953 A1 | 10/2014 | |
| WO | 2015200120 A1 | 12/2015 | |
| WO | 2016187443 A1 | 11/2016 | |
| WO | 2017091282 A1 | 6/2017 | |
| WO | WO-2021114608 A1 * | 6/2021 | G06F 16/90 |

OTHER PUBLICATIONS

EP Application # 19707121.0 Office Action dated Jan. 11, 2022.
EP Application # 19762480.2 Office Action dated Feb. 10, 2022.
U.S. Appl. No. 16/262,971 Office Action dated Aug. 2, 2021.
International Application # PCT/IB2020/061625 Search Report dated May 18, 2021.
U.S. Appl. No. 16/264,248 Office Action dated Jul. 9, 2021.
Wikipedia, "Idle (CPU)," pp. 1-1, May 1, 2018, as downloaded from https://en.wikipedia.org/w/index.php?% 20title=Idle_(CPU) &oldid=839126219.
EP Application # 19707121.0 Summons to Oral Proceedings dated May 13, 2022.
EP Application # 19762480.2 Summons to Oral Proceedings dated Jun. 23, 2022.
Yasay et al., U.S. Appl. No. 17/094,844, filed Nov. 11, 2020.
IEEE Std 802.3ch-2020, "IEEE Standard for Ethernet, Amendment 8: Physical Layer Specifications and Management Parameters for 2.5 GB/s, 5 GB/s and 10 GB/s Automotive Electrical Ethernet", pp. 1-207, Jun. 4, 2020.

(56) References Cited

OTHER PUBLICATIONS

IEEE Std 802.3bp-2016, "IEEE Standard for Ethernet, Amendment 4: Physical Layer Specifications and Management Parameters for 1 GB/s Operation over a Single Twisted-Pair Copper Cable", pp. 1-211, Jun. 30, 2016.
IEEE Std 802.3bw-2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, Oct. 26, 2015.
IEEE Std 802.3cg-2019, "IEEE Standard for Ethernet, Amendment 5: Physical Layers Specifications and Management Parameters for 10 Mb/s Operation and Associated Power Delivery over a Single Balanced Pair of Conductors", pp. 1-256, Nov. 7, 2019.
U.S. Appl. No. 16/262,971 Office Action dated Feb. 16, 2021.
U.S. Appl. No. 16/264,248 Office Action dated Feb. 23, 2021.
Kang et al., "Enabling Cost-Effective Data Processing with Smart SSD," IEEE 29th Symposium on Mass Storage Systems and Technologies (MSST), pp. 1-12, year 2013.
Mishra et al., "On-Disk Data Processing: Issues and Future Directions," arXiv, pp. 1-24, yer 2017.
U.S. Appl. No. 16/264,248 Office Action dated Aug. 24, 2022.
JP Application # 2021503769 Office Action dated Oct. 18, 2022.
U.S. Appl. No. 17/246,650 Office Action dated Dec. 22, 2022.
JP Application # 2021503760 Office Action dated Feb. 7, 2023.
JP Application # 2021503769 Office Action dated Feb. 21, 2023.
EP Application # 23157721.4 Search Report dated Mar. 27, 2023.
JP Application # 2021504383 Office Action dated Apr. 25, 2023.
JP Appliction # 2021504432 Office Action dated Apr. 25, 2023.
EP Application # 23174241.2 Search Report dated Jun. 12, 2023.
EP Application # 23167414.4 EESR dated Sep. 27, 2023.
JP Application # 2021504432 Office Action dated Aug. 15, 2023.
JP Application # 2021504383 Office Action dated Sep. 5, 2023.
JP Application # 2022521079 Office Action dated May 7, 2024.
CN Application # 201980050665.4 Office Action dated Mar. 12, 2024.
KR Application # 1020217004754 Office Action dated Mar. 14, 2024.
CN Application # 201980050454.0 Office Action dated Apr. 12, 2024.
JP Application # 2022521079 Office Action dated Oct. 1, 2024.

\* cited by examiner

AUTOMOTIVE DATA PROCESSING SYSTEM WITH EFFICIENT GENERATION AND EXPORTING OF METADATA

CROSS-REFERENCE TO RELATED APPLICATIONS

This application claims the benefit of U.S. Provisional Patent Application 62/948,027, filed Dec. 13, 2019, whose disclosure is incorporated herein by reference.

FIELD OF THE DISCLOSURE

The present disclosure relates generally to automotive data processing, and particularly to methods and systems for metadata generation and exporting in vehicles.

BACKGROUND

Autonomous cars and other vehicles generate and process high volumes of data, sometimes on the order of Terabytes, in the course of a day of driving. Sources of data in an autonomous car comprise, for example, cameras and other sensors, Advanced Driver-Assistance Systems (ADAS), Telematics Control Units (TCU), Infotainment systems, as well as various Electronics Control Units (ECUs). Conventionally, copious volumes of data are uploaded on a regular basis to a remote processor.

The description above is presented as a general overview of related art in this field and should not be construed as an admission that any of the information it contains constitutes prior art against the present patent application.

SUMMARY

An embodiment that is described herein provides an automotive data processing system including a storage subsystem and a processor. The storage subsystem is disposed in a vehicle and is configured to store at least data produced by one or more data sources of the vehicle. The processor is installed in a vehicle and is configured to apply, to the data stored in the storage subsystem or that is en route to be stored in the storage subsystem, at least one model that identifies one or more specified features-of-interest in the data, so as to generate metadata that tags occurrences of the specified features-of-interest in the stored data, and to export at least part of the metadata to an external system that is external to the vehicle.

In some embodiments, the processor is configured to identify occurrences of a same feature-of-interest in the data produced by two or more different ones of the data sources, and, in generating the metadata, to tag the data so as to link to one another the occurrences of the same feature-of-interest appearing in data produced by the two or more different ones of the data sources. In an embodiment, the data produced by the two or more ones of the data sources are of a same type of data. In another embodiment, the data produced by the two or more ones of the data sources are of different types of data. In yet another embodiment, the two or more ones of the data sources are disposed at different locations in the vehicle.

In some embodiments, the processor is further configured to receive from the external system, in response to the exported metadata, a request for one or more selected portions of the data relating to the features-of-interest, and to provide, to the external system, at least the selected portions of the data but less than all the data. In an example embodiment, the processor is configured to provide to the external system two or more selected portions of the data, which were produced by two or more different ones of the data sources and which are associated with a same feature-of-interest.

In a disclosed embodiment, the processor is configured to select the part of the metadata for exporting, in accordance with a selection criterion. In an embodiment, the processor is configured to export the metadata without concurrently exporting data corresponding to the metadata.

In an example embodiment, the storage subsystem is configured to store at least data produced by multiple independent data sources in the vehicle. In another embodiment the storage subsystem is configured to store at least data produced by multiple data sources installed at different locations in the vehicle. In an embodiment, the storage subsystem is configured to store two or more different types of the data.

In some embodiments, the processor is configured to receive the model from the external system. In an embodiment, the processor is configured to export the metadata while the vehicle is connected to a docking station. In another embodiment, the processor is configured to export the metadata independently of whether the vehicle is connected to a docking station.

In some embodiments, the model includes an Artificial Intelligence (AI) inference model, and the processor is configured to generate the metadata by applying the AI inference model to the data. In an embodiment, the processor is configured to receive the AI inference model pre-trained from the external system, and to update a training of the AI inference model in the vehicle.

In some embodiments, the storage subsystem includes a centralized storage device that is configured to store the data produced by a plurality of the data sources. In an embodiment, the centralized storage device is configured to store the data produced by two or more ones of the data sources that are of different types.

In an embodiment, the processor is further configured to apply to the data a second model different from the first model, the second model identifying one or more second features-of-interest in the data, to add to the metadata second occurrences of the second features-of-interest in accordance with the second model, and to provide to the external system one or more of (i) metadata relating only to the occurrences of the features-of-interest, (ii) metadata relating only to the second occurrences of the second features-of-interest, and (iii) metadata relating both to the occurrences and to the second occurrences. In an embodiment, the processor is configured to store the metadata in structured form in the storage subsystem.

There is additionally provided, in accordance with an embodiment that is described herein, an automotive data processing method including storing, in a storage subsystem disposed in a vehicle, at least data produced by one or more data sources of the vehicle. Using a processor installed in a vehicle, at least one model, which identifies one or more specified features-of-interest in the data, is applied to the data stored in the storage subsystem or that is en route to be stored in the storage subsystem, so as to generate metadata that tags occurrences of the specified features-of-interest in the stored data. At least part of the metadata is exported to an external system that is external to the vehicle.

There is additionally provided, in accordance with an embodiment that is described herein, an automotive data processing system including a plurality of data sources and a processor. The data sources are installed in a vehicle and are configured to generate data. The processor is installed in the vehicle and is configured to collect the data generated by the data sources, to store the data locally in a storage device disposed in the vehicle, without exporting the data outside the vehicle, to identify one or more portions-of-interest in the locally stored data, and, while the vehicle is connected to a docking station that is coupled to an external system located remotely from the docking station, to upload to the external system at least the identified portions-of-interest and less than all the locally stored data.

In some embodiments, the processor is configured to collect and store the data, and identify the portions-of-interest, independently of whether the vehicle is connected to a docking station. In an embodiment, the processor is configured to collect the data from two or more different ones of the data sources that produce a same type of data. In another embodiment, the processor is configured to collect the data from two or more different ones of the data sources that produce different types of data.

In yet another embodiment, the processor is configured to collect the data from two or more different ones of the data sources that are disposed at different locations in the vehicle. In a disclosed embodiment, the processor is configured to identify and upload two or more portions-of-interest, which were produced by two or more different ones of the data sources and which are associated with a same feature-of-interest.

There is also provided, in accordance with an embodiment that is described herein, an automotive data processing method including generating data by a plurality of data sources installed in a vehicle. Using a processor installed in a vehicle, the data generated by the data sources is collected and stored locally in a storage device disposed in the vehicle, without exporting the data outside the vehicle, one or more portions-of-interest of the locally stored data are identified, and, while the vehicle is connected to a docking station that is coupled to an external system located remotely from the docking station, at least the identified portions-of-interest, and less than all the locally stored data, is uploaded to the external system.

There is further provided, in accordance with an embodiment that is described herein, an automotive data processing system including multiple data sources, a packet network and a processor. The data sources are distributed at different locations in a vehicle and are configured to generate data. The packet network is disposed in the vehicle and is configured to transfer the data from the multiple data sources to a central storage location in the vehicle. The processor is installed in the vehicle and is configured to generate metadata corresponding to the data transferred from the multiple data sources and stored at the central storage location, and to transfer one or more selected portions of the sensor data to an external system that is external to the vehicle, the selected portions being selected based on the metadata corresponding to the data transferred from the multiple data sources and stored at the central storage location.

In an embodiment, the multiple data sources include two or more different data sources that are configured to produce different types of data. In another embodiment, the data produced by the two or more ones of the data sources are of different types of data. In a disclosed embodiment, the processor is configured to select the one or more portions of the sensor data, at least partly in response to an indication of one or more features-of-interest received from the external system.

In an example embodiment, the processor is configured to generate the metadata by applying an Artificial Intelligence (AI) inference model to the data stored at the central storage location. In an embodiment, in generating the metadata, the processor is configured to tag one or more occurrences of one or more features-of-interest in the data. In another embodiment, in generating the metadata, the processor is configured to tag occurrences of a same feature-of-interest in two or more different types of the data, or in data generated by two or more different data sources.

There is additionally provided, in accordance with an embodiment that is described herein, an automotive data processing method including generating data by multiple data sources distributed at different locations in a vehicle, and transferring the data from the multiple data sources to a central storage location in the vehicle, over a packet network disposed in the vehicle. Using a processor installed in a vehicle, metadata is generated corresponding to the data transferred from the multiple data sources and stored at the central storage location, and one or more selected portions of the sensor data are transferred to an external system that is external to the vehicle, the selected portions being selected based on the metadata corresponding to the data transferred from the multiple data sources and stored at the central storage location.

There is also provided, in accordance with an embodiment that is described herein, an automotive data analysis system including an interface for communicating with a vehicle, and a computer. The computer is configured to define a model that identifies one or more specified features in data produced by one or more data sources of the vehicle, to provide the model to a processor installed in the vehicle, to receive metadata from the processor in the vehicle, wherein the metadata was generated by the processor using the model and tags occurrences of the specified features in the data, and to analyze the received metadata.

In an embodiment, the interface is configured to receive the metadata while the vehicle is connected to a docking station. In another embodiment, the interface is configured to receive the metadata from the vehicle independently of whether the vehicle is connected to a docking station.

In some embodiments, the model includes an Artificial Intelligence (AI) inference model, and the computer is configured to train the AI inference model and to provide the trained AI inference model to the processor in the vehicle. In a disclosed embodiment, the computer is configured to send to the processor in the vehicle, in response to the received metadata, a request for one or more selected portions of the stored data, to receive the requested one or more selected portions from the processor, and to analyze the one or more selected portions of the data.

In another embodiment, the computer is configured to request two or more selected portions of the stored data, which were produced by two or more different ones of the data sources. In yet another embodiment, the computer is configured to request two or more selected portions of the stored data, which are associated with a same feature-of-interest.

There is additionally provided, in accordance with an embodiment that is described herein, an automotive data analysis method including, in a computer external to a vehicle, defining a model that identifies one or more specified features in data produced by one or more data sources of the vehicle, and providing the model to a processor installed in the vehicle. Metadata is received in the computer external to the vehicle, from the processor in the vehicle, wherein the metadata was generated by the processor using the model and tags occurrences of the specified features in the data. The received metadata is analyzed.

DETAILED DESCRIPTION OF EMBODIMENTS

Figure 1:
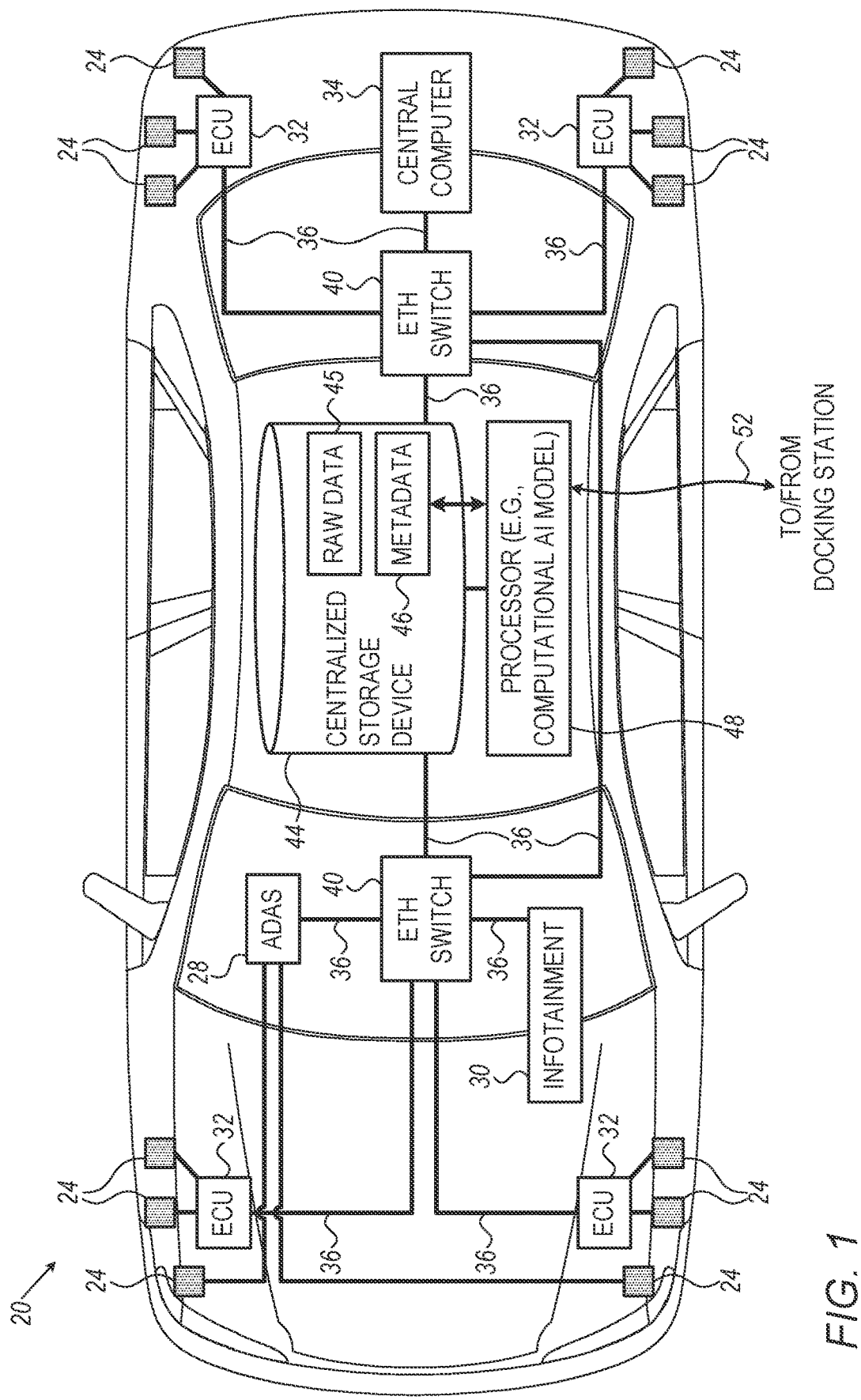
FIG. 1 is a block diagram that schematically illustrates an automotive data processing system, in accordance with an embodiment that is described herein.

A modern vehicle generates vast amounts of data of various types, originating from various data sources. An autonomous car, for example, may generate one or more video feeds from video cameras, sensor data of various kinds streaming from sensors disposed at various locations in vehicle, radar and lidar information, driver behavior information, information from infotainment subsystems and user applications, and location and navigation information such as GPS data and maps. In a typical day of driving, an autonomous car may generate on the order of four Terabytes of data.

The data produced in a vehicle during operation can provide extremely valuable information if analyzed correctly. For example, GPS data and car driving data can be used for updating commute prediction models; camera footage can be used to optimize the autonomous driving capabilities and safety procedures of autonomous cars; driving behavior information can be used by insurance companies to determine an insurance premium for the driver, to name only a few examples.

The computational power needed for performing such analysis is typically far beyond the capabilities of current state of the art, or affordable, in-vehicle computing resources. Therefore, in various embodiments, in order to analyze the data effectively, at least some of the raw data is exported to an external system, e.g., a cloud-based data processing system. On the other hand, limitations on time, bandwidth and power consumption make it infeasible to transfer all the raw data from the vehicle to the external system. These constraints limit the effectiveness of analyzing the data generated in the vehicle and extracting valuable and actionable information from it.

In view of the foregoing, embodiments that are described herein provide improved methods and systems for processing, communicating and analyzing data generated in vehicles.

In some disclosed embodiments, an automotive data processing system is deployed in a vehicle. The automotive data processing system comprises a storage subsystem coupled to a processor. During operation of the vehicle, the storage subsystem stores raw data that is produced by the various data sources. The processor pre-processes the raw data by identifying specified features-of-interest, and generates metadata that tags occurrences of the specified features-of-interest in the raw data. The metadata, or at least a selected part thereof, is exported from the vehicle to the external system.

The external system typically analyzes the metadata to identify specific portions of the raw data that are of interest, and retrieves these specific portions from the vehicle for analysis. In an embodiment, the automotive data processing system is configured to communicate with the external system while the vehicle is connected to a docking station. In this embodiment, the processor stores the metadata locally in the storage subsystem on an ongoing basis. When the vehicle is docked, i.e., parked and connected to a docking station, the processor transmits the accumulated metadata to the external system.

In some embodiments, the in-vehicle processor identifies the features-of-interest and generates the metadata by applying a pre-trained Artificial Intelligence (AI) inference model to the raw data. The AI model may be supplied, for example, by the external system. In some embodiments the processor applies several different AI models, e.g., for identifying different features-of-interest, or for identifying the same features-of-interest in different types of raw data. Several implementation examples and demonstrative use-cases of the disclosed technique are described below.

In some embodiments, the same feature-of-interest (e.g., object or event) may appear in two or more different streams of raw data that are produced by two or more data sources, e.g., sensors that are of the same type but are disposed at different locations in the vehicle, or sensors of different type that are disposed at the same location or different locations in the vehicle. In some embodiments, the in-vehicle processor identifies the feature-of-interest (e.g., object or event) in the different streams of raw data, and generates metadata that tags portions of the raw data which are common to and shared by the occurrences of the same feature-of-interest in the different streams. Further aspects of generating and processing metadata relating to different media objects are addressed in U.S. Patent Application Publication 2020/0042548, entitled "Metadata Generation for Multiple Object Types" whose disclosure is incorporated herein by reference.

Typically, the metadata is several orders of magnitude smaller than the raw data, simpler and has a structured format. As such, the metadata can be transmitted to the external system over a short period of time using modest bandwidth. The specific portions of raw data, which the external system subsequently requests based on the metadata, are also much smaller than the overall volume of raw data. Therefore, the disclosed technique provides an optimal "division of labor" that (i) overcomes the communication bottleneck between the in-vehicle system and the external system, and (ii) does not compromise the quality of data analysis.

FIG. 1 is a block diagram that schematically illustrates an automotive data processing system 20, in accordance with an embodiment that is described herein. System 20 is installed in a vehicle, and comprises various sensors 24, multiple Electronics Control Units (ECUs) 32, an Advanced Driver-Assistance System (ADAS) 28, an infotainment system 30 and a central computer 34.

Sensors 24 may comprise, for example, video cameras, velocity sensors, accelerometers, audio sensors, infra-red sensors, radar sensors, lidar sensors, ultrasonic sensors, rangefinders or other proximity sensors, or any other suitable sensor type. In the present example, each ECU 32 (sometimes referred to as a "zone ECU") is connected to the sensors installed in a respective zone of the vehicle. Each ECU 32 typically controls its respective sensors 24 and collects data from the sensors. In an embodiment, one or more of sensors 24, e.g., image sensors, are connected directly to ADAS 28, not via ECUs 32.

In the present context, any element in system 20 that produces data (including, for example, sensors 24, ECUs 32, ADAS 28, infotainment system 30 and central computer 34)

is considered a "data source." ECUs 32, ADAS 28, infotainment system 30 and central computer 34 are regarded as examples of "electronic subsystem" of the vehicle. As seen, a certain system component may serve both as a data source and as an electronic subsystem.

In some embodiments, the various electronic subsystems of system 20 are deployed at various different locations in the vehicle, and communicate over a packet network installed in the vehicle. In the present example the packet network comprises an Ethernet network, but other suitable network protocols can also be used. The network comprises multiple Ethernet links 36, and one or more Ethernet switches 40. In various embodiments, the bit rate used in the network may be 10G bits per second (10 Gbps) in accordance with IEEE 802.3ch, 1000 Mbps in accordance with IEEE 802.3 bp, 100 Mbps in accordance with IEEE 802.3bw, 10 Mbps in accordance with IEEE 802.3cg (10Base-T1s), or any other suitable bit rate. Links 36 may comprise, for example, twisted-pair copper links or any other type of link suitable for Ethernet communication.

In the example of FIG. 1, system 20 further comprises a centralized storage device 44 (also referred to as a "storage subsystem") and a processor 48. Aspects of centralized storage in automotive networks are addressed, for example, in U.S. patent application Ser. No. 17/094,844, filed Nov. 11, 2020, entitled "Automotive Network with Centralized Storage," whose disclosure is incorporated herein by reference.

Storage device 44 stores raw data 45 that is provided by the various data sources in the vehicle (e.g., sensors and/or electronic subsystems). In some embodiments, processor 48 identifies specified features-of-interest in raw data 45, generates metadata 46 that tags occurrences of the specified features-of-interest in the raw data, and stores metadata 46 in storage device 45. In an embodiment, processor 48 identifies the features-of-interest by applying a computational Artificial Intelligence (AI) engine to raw data 45. Processor 48 exports at least part of the metadata to an external system that is external to the vehicle, e.g., to a cloud-based data processing system or another suitable computer that is external to the vehicle.

In an embodiment, centralized storage device 44 comprises a Solid State Drive (SSD) that is connected directly to the packet network installed in the vehicle. As seen in the figure, in the present example centralized storage device 44 comprises two interfaces that are connected via respective links 36 to two different ports of two different switches 40. This scheme provides a degree of redundancy, since failure of a single interface (or of the corresponding link) will not disconnect centralized storage device 44 from the network.

In the present example, processor 48 and storage device 44 communicate with one another over a fast computer bus, such as a Peripheral Component Interconnect express (PCIe) bus. Alternatively, in some embodiments processor 48 may be connected independently to the packet network, in which case processor 48 and storage device 44 communicate with one another over the network. Processor 48 is configured to communicate with a docking station or any other suitable interface for transferring data (not seen in the figure) to which the vehicle connects, using a data link 52.

Typically, the data sources (sensors and/or electronic subsystems) send raw data 45 to centralized storage device 44 over the network. In various embodiments, the data sources and centralized storage device 44 may communicate using any suitable protocol, such as the Non Volatile Memory express over Fabrics (NVMe-oF) protocol or NVMe-over-TCP. Further aspects of centralized storage, which may be applied in system 20, are described in U.S. patent application Ser. No. 17/094,844, entitled "Automotive Network with Centralized Storage," filed Nov. 11, 2020, whose disclosure is incorporated herein by reference.

The configuration of communication system 20 and its components, such as of the various devices and electronic subsystems and/or of centralized storage device 44, as shown in FIG. 1, are example configurations that are depicted solely for the sake of clarity. In alternative embodiments, any other suitable configurations can be used. For example, system 20 may comprise other suitable types of electronic subsystems and/or devices, laid out and connected in any other suitable scheme. As another example, the packet network (including links 36 and switches 40) may have any other suitable topology.

The different elements of system 20 and its components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of the components of system 20, e.g., of ECUs 32, storage device 44 and/or processor 48, may be implemented in software and/or using a combination of hardware and software elements. Elements that are not mandatory for understanding of the disclosed techniques have been omitted from the figure for the sake of clarity.

In some embodiments, some functions of ECUs 32, storage device 44 and/or processor 48 may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

As noted above, the various data sources in the vehicle (e.g., sensors and electronic subsystems) produce and send raw data 45 for storage in centralized storage device 44 during on-going operation of the vehicle. Raw data 45 may comprise, for example, video data, audio data, sensor data, radar and/or lidar data, driver behavior data, data from infotainment subsystems and/or user applications, location and/or navigation data such as GPS data and maps, and/or any other suitable type of data.

As seen, at least some of the raw data (e.g., video) may be unstructured. The raw data is typically of multiple different types (modalities), and typically originates from multiple independent data sources of multiple different types that are installed at multiple different locations in the vehicle. In some embodiments, multiple streams of raw data are generated by multiple sensors of the same type (e.g., multiple video cameras or multiple lidars, for example), each of which sensors is disposed at a different location in the vehicle. In other embodiments, multiple instances of the same type of sensor are disposed at the same location in the vehicle to provide redundant streams of the same type of raw data.

Processor 48 scans raw data 45 in order to identify one or more specified features-of-interest, generates a database of metadata 46 that tags occurrences of the specified features-of-interest in the raw data, and stores metadata 46 in storage device 45. In various embodiments, processor 48 may search for any suitable features-of-interest, such as, for example:

Objects or environmental conditions in the vicinity of the vehicle that are visible in video or detectable in sensor data (e.g., an obstacle, a traffic sign, another vehicle or a pedestrian approaching the vehicle).

Events relating to driver behavior (e.g., vehicle slowing down, speeding up in response to a traffic light, swerving to avoid an accident or obstacle, or reacting to a traffic sign).

Events relating to road behavior of the vehicle (e.g., automatic driving effects).

Events relating to presence or behavior of nearby vehicles, e.g., crowded traffic or light traffic scenarios.

Events relating to driver intervention with autonomous operation of the vehicle.

Communication with external elements (e.g., other vehicles, lights, road sensors).

Mechanical symptoms in the vehicle (e.g., change in responsiveness or noise due to loss of tire pressure, wearing down of one or more brake pads, loss of visibility due to a headlight or other light burning out, reduced connectivity due to in-vehicle network problems).

The list of features-of-interest above is given solely by way of example. Additionally or alternatively, processor 48 may identify any other suitable features that might be of interest for analysis.

As noted above, in some cases a certain feature-of-interest (e.g., object or event) occurs in raw data of multiple data sources. The multiple data sources (and thus the streams of raw data) may be of different types (e.g., video, audio, LIDAR, radar etc.), or multiple instances of the same type of raw data (e.g., video captured at different locations in the vehicle). For example, a road accident, or a mechanical breakdown or failure, may be visible in video feeds, audible in audio data, sensed by various sensors and/or reported by one or more electronic subsystems. The correlation of such occurrences, of a given feature-of-interest in raw data of different data sources, is by itself valuable. Thus, in some embodiments processor 48 tags the occurrence of such a feature-of-interest (e.g., object or event) using the same tag, or otherwise in a way that links the occurrences in the data of the different sensors to one another.

In various embodiments, processor 48 may use various techniques for identifying the specified features-of-interest in raw data 45. In some embodiments, processor 48 runs a computational Artificial Intelligence (AI) engine that is configured to compile and apply pre-trained AI inference models that identify features-of-interest in raw data 45. In some embodiments, processor 48 applies to the raw data several different AI models, e.g., for identifying different features-of-interest, or for identifying the same feature-of-interest in different types of raw data.

In an embodiment, processor 48 receives the pre-trained Artificial Intelligence (AI) model or models from the external system, e.g., via data link 52 while the vehicle is connected to a docking station. During on-going operation of the vehicle, processor 48 applies the pre-trained AI model or models to raw data 45 provided by the various data sources.

Processor 48 identifies occurrences of the features-of-interest in raw data 45 using the AI model or models, and generates metadata 46 that tags these occurrences. Processor 48 may apply AI models to raw data already stored in storage deice 44, and/or to raw data that is en route to be stored in storage device 44. Metadata 46 is stored temporarily in storage device 44. At a suitable time, e.g., when the vehicle is connected to a docking station, processor 48 transmits metadata 46 that is computed in the vehicle to the external system, typically without transferring all of the raw data.

Note that, since the data size of metadata 46 is relatively small, certainly when compared to the raw data, in some embodiments it is not mandatory for the vehicle to use its connection to a docking station in order to transmit the metadata to the external system. In an embodiment, processor 48 may transmit metadata 46 to the external system independently of whether the vehicle is connected to a docking station, e.g., over a suitable wireless link such as a cellular link, mobile Wi-Fi connectivity coupling or other suitable wireless link, during vehicle operation. Similarly, in an embodiment the external system may send an AI model to processor 48 independently of whether the vehicle is connected to a docking station, e.g., over a suitable wireless link. Generally, communication via a docking station (e.g., receiving an AI model, and exporting metadata and/or requested portions of raw data) is regarded as an offline process.

In some embodiments processor 48 transmits all of metadata 46 to the external system. In other embodiments, processor 48 selects only part of metadata 46 using a selection criterion, and sends only the selected part of the metadata to the external system.

The disclosed techniques can be used for analyzing a wide variety of features in various use-cases. Consider, for example, a use-case in which the external system analyzes the behavior of an autonomous vehicle when animals appear on or around the road. To perform this sort of analysis, in an embodiment, the external system trains an AI model that recognizes animals in raw video data. Processor 48 receives the pre-trained AI model, compiles it and applies it to the video camera feeds provided by the various cameras in the vehicle. Based on the identified occurrences of the feature-of-interest (appearances of animals in the videos), processor 48 generates metadata that tags the video frames in which animals appear. Tagged frames may be located in video streams from two or more video sensors disposed at different locations in the vehicle. Processor 48 uploads the metadata to the external system for initial analysis.

In an embodiment, the external system may then request portions-of-interest of raw data 45 that are related to the identified occurrences, e.g., video excerpts that start slightly before appearance of an animal. Note that the requested portions-of-interest of raw data need not necessarily be the exact ones in which the occurrences were identified. For example, the external system may log the times at which animals were identified in the video, and request sensor data that correspond to these times. In an embodiment, processor 48 uploads portions-of-interest of raw data without being requested to do so by the external system, e.g., along with the metadata.

As another example, consider a use-case in which the external system analyzes the behavior of an autonomous vehicle when pedestrians are present, in rainy conditions. To perform this sort of analysis, in an embodiment, the external system provides processor 48 with multiple pre-trained AI models—e.g., a model for recognizing rainy scenes in video, another model for recognizing pedestrians in video, and possibly other models for recognizing rainy conditions in the outputs of other types of sensors such as environmental-condition sensors. Using these models, processor 48 generates metadata that tags time intervals in the video in which the scene is rainy, time intervals in the video showing pedestrians, and possibly in the raw data of other sensors. The external system may later find the intersection between the various types of intervals (i.e., identify time intervals of rainy conditions containing pedestrians), and request sensor data and/or subsystem data corresponding to these time intervals.

The two examples above are highly simplified and in no way limiting, and were given only to demonstrate the effectiveness of the disclosed technique. Other examples may involve, for example, a larger number of data sources of different types.

Figure 2:
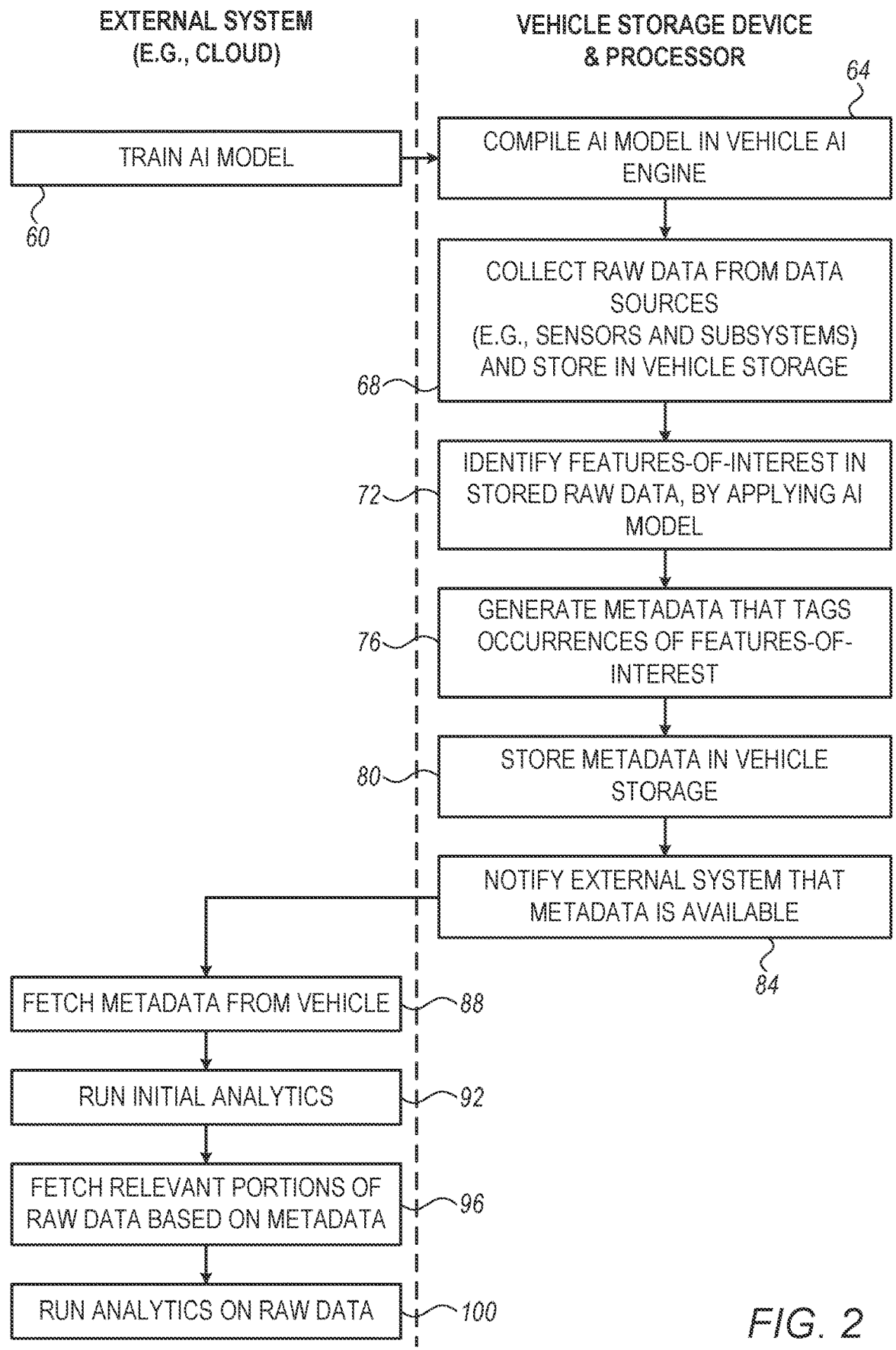
FIG. 2 is a flow chart that schematically illustrates a method for metadata generation and processing in the automotive system of FIG. 1, in accordance with an embodiment that is described herein.

FIG. 2 is a flow chart that schematically illustrates a method for metadata generation and processing, in accordance with an embodiment that is described herein. The left-hand side of the figure depicts actions performed by the external system (e.g., cloud-based data processing system). The right-hand side of the figure depicts actions performed by system 20 in the vehicle.

At a model training operation 60, the external system trains an AI inference model for identifying a certain feature-of-interest in raw data 45 of a certain type (e.g., identifying a human in video data, identifying a mechanical breakdown in audio data or sensor data, etc.). The trained model is provided to processor 48, for example (although not necessarily) while the vehicle is connected to a docking station. At a compilation operation 64, processor 48 compiles the AI model to run on the processor's computational AI engine. In an embodiment, processor 48 may update the training of the AI model to account for local inputs, e.g., perform additional training using data acquired in the specific vehicle. Such an update can be useful, for example, to better fit the area typically driven by the specific vehicle. Additional training of this sort may be performed at any stage, e.g., while the vehicle is connected to a docking station and/or while driving.

At a data collection operation 68, the various data sources in the vehicle generate raw data 45 and send the raw data for storage in storage device 44. At an identification operation 72, processor 48 identifies occurrences of the feature-of-interest in raw data 45 by applying the AI model.

At a metadata generation operation 76, processor 48 generates metadata 46, which tags the identified occurrences. Each tag in metadata 46 typically indicates the feature-of-interest being identified, and the location of the occurrence in the raw data (e.g., frame number in video, or other location depending on the type of raw data). Processor 48 may apply AI models to raw data already stored in storage device 44, and/or to raw data that is en route to be stored in storage device 44.

As noted above, metadata generation may be applied to multiple sets of raw data, and may involve collating tags of the same feature-of-interest (e.g., object or event) that appears in different sets of raw data supplied by different sensors of the same type or different types.

At a metadata storage operation 80, processor 48 stores metadata 46 in storage device 44. At a notification operation 84, processor 48 notifies the external system that metadata 46 is available. At a metadata retrieval operation 88, the external system fetches metadata 46 from storage device 44 of the vehicle. In various embodiments, metadata 46 may be "pulled" from the vehicle by the external system or "pushed" to the external system on initiative of the vehicle. For example, processor 48 may push metadata to the external system periodically, or when the vehicle is connected to a docking station.

At an initial analysis operation 92, the external system runs a suitable initial analysis on the metadata. The initial analysis typically determines, based on the metadata, one or more portions-of-interest of raw data 45 that pertains to the feature-of-interest. At a data retrieval operation 96, the external system fetches the portions-of-interest of raw data 45 from storage device 44 of the vehicle. The external system then analyzes the portions-of-interest of raw data, at an analytics operation 100.

In an embodiment, the process described above may be repeated with a different AI model that processor 48 re-maps to the computational AI engine and applies so as to tag different features-of-interest (or the same features-of-interest in a different type of raw data). Processor 48 may add the new metadata to the existing metadata database, or generate and store a separate database of metadata 46 in storage device 44.

Although the embodiments described herein mainly address raw data acquired in an automotive system the methods and systems described herein can also be used in other applications, such as in processing of unstructured raw data of various other kinds, e.g., video library analytics, voice call analytics, and the like.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An automotive data processing system, comprising:
a storage subsystem, which is disposed in a vehicle and is configured to store at least data produced by one or more data sources of the vehicle; and
a processor, which is installed in the vehicle and is configured to:
apply, to the data stored in the storage subsystem or that is en route to be stored in the storage subsystem, at least one model that identifies one or more specified features-of-interest in the data, so as to generate metadata that tags occurrences of the specified features-of-interest in the stored data;
export over a data link at least part of the metadata to an external system that is external to the vehicle, wherein the metadata tags the occurrences of the specified features-of-interest, prior to exporting the data containing the specified features-of-interest tagged by the metadata;
after exporting the metadata to the external system and prior to exporting the data to which the exported metadata pertains, receive by the processor installed in the vehicle from the external system that is external to the vehicle a request for one or more selected portions of the data, the selected portions of the data relating to specific features-of-interest tagged by the metadata that was generated in the vehicle using the at least one model and exported from the vehicle to the external system; and
provide, from the processor installed in the vehicle to the external system, based on the request, the selected portions of the data, which contain the specified features-of-interest tagged by the metadata and were not yet exported to the external system, but less than all the data to reduce a volume of data transferred over the data link.

2. The automotive data processing system according to claim 1, wherein the processor is configured to identify occurrences of a same feature-of-interest in the data produced by two or more different ones of the data sources, and, in generating the metadata, to tag the data so as to link to one another the occurrences of the same feature-of-interest appearing in data produced by the two or more different ones of the data sources.

3. The automotive data processing system according to claim 2, wherein the data produced by the two or more ones of the data sources are of a same type of data.

4. The automotive data processing system according to claim 2, wherein the data produced by the two or more ones of the data sources are of different types of data.

5. The automotive data processing system according to claim 2, wherein the two or more ones of the data sources are disposed at different locations in the vehicle.

6. The automotive data processing system according to claim 1, wherein the processor is configured to provide to the external system two or more selected portions of the data, which were produced by two or more different ones of the data sources and which are associated with a same feature-of-interest.

7. The automotive data processing system according to claim 1, wherein the processor is configured to select the part of the metadata for exporting, in accordance with a selection criterion.

8. The automotive data processing system according to claim 1, wherein the processor is configured to export the metadata without concurrently exporting data corresponding to the metadata.

9. The automotive data processing system according to claim 1, wherein the storage subsystem is configured to store at least data produced by multiple independent data sources in the vehicle.

10. The automotive data processing system according to claim 1, wherein the storage subsystem is configured to store at least data produced by multiple data sources installed at different locations in the vehicle.

11. The automotive data processing system according to claim 1, wherein the storage subsystem is configured to store two or more different types of the data.

12. The automotive data processing system according to claim 1, wherein the processor is configured to receive the model from the external system.

13. The automotive data processing system according to claim 1, wherein the processor is configured to export the metadata while the vehicle is connected to a docking station.

14. The automotive data processing system according to claim 1, wherein the processor is configured to export the metadata independently of whether the vehicle is connected to a docking station.

15. The automotive data processing system according to claim 1, wherein the at least one model comprises at least one pretrained Artificial Intelligence (AI) inference model, and wherein the processor is configured to generate the metadata by applying the at least one pretrained AI inference model to the data and to update a training of the at least one pretrained AI inference model in the vehicle.

16. The automotive data processing system according to claim 1, wherein the storage subsystem comprises a centralized storage device that is configured to store the data produced by a plurality of the data sources.

17. The automotive data processing system according to claim 16, wherein the centralized storage device is configured to store the data produced by two or more ones of the data sources that are of different types.

18. The automotive data processing system according to claim 1, wherein the processor is further configured to:
apply to the data a second model different from the first model, the second model identifying one or more second features-of-interest in the data;
add to the metadata second occurrences of the second features-of-interest in accordance with the second model; and
provide to the external system one or more of (i) metadata relating only to the occurrences of the features-of-interest, (ii) metadata relating only to the second occurrences of the second features-of-interest, and (iii) metadata relating both to the occurrences and to the second occurrences.

19. The automotive data processing system according to claim 1, wherein the processor is configured to store the metadata in structured form in the storage subsystem.

20. An automotive data processing method, comprising:
storing, in a storage subsystem disposed in a vehicle, at least data produced by one or more data sources of the vehicle; and
using a processor installed in the vehicle:
applying, to the data stored in the storage subsystem or that is en route to be stored in the storage subsystem, at least one model that identifies one or more specified features-of-interest in the data, so as to generate metadata that tags occurrences of the specified features-of-interest in the stored data;
exporting over a data link at least part of the metadata to an external system that is external to the vehicle, wherein the metadata tags the occurrences of the specified features-of-interest, prior to exporting the data containing the specified features-of-interest tagged by the metadata;
after exporting the metadata to the external system and prior to exporting the data to which the exported metadata pertains, receiving from the external system a request for one or more selected portions of the data, the selected portions of the data relating to specific features-of-interest tagged by the metadata that was generated in the vehicle using the at least one model and exported from the vehicle to the external system; and
providing, to the external system, based on the request, the selected portions of the data, which contain the specified features-of-interest tagged by the metadata and were not yet exported to the external system, but less than all the data to reduce a volume of data transferred over the data link.

21. The automotive data processing method according to claim 20, wherein applying the at least one model comprises identifying occurrences of a same feature-of-interest in the data produced by two or more different ones of the data sources, and wherein generating the metadata comprises tagging the data so as to link to one another the occurrences of the same feature-of-interest appearing in data produced by the two or more different ones of the data sources.

22. The automotive data processing method according to claim 21, wherein identifying the occurrences of the same feature-of-interest comprises identifying the occurrences in data supplied by two or more ones of the data sources that are disposed at different locations in the vehicle.

23. The automotive data processing method according to claim 20, wherein providing the selected portions comprises providing, to the external system, two or more selected portions of the data, which were produced by two or more different ones of the data sources and which are associated with a same feature-of-interest.

24. The automotive data processing method according to claim 20, wherein exporting the metadata comprises exporting the metadata separately from data corresponding to the metadata, selecting one or more portions-of-interest of the data based on the metadata, and exporting the selected one or more portions-of-interest of the data when the vehicle is connected to a docking station.

25. The automotive data processing system according to claim 1, wherein the at least one model comprises an AI Inference model received from the external system.

* * * * *